(12) United States Patent
Suvanen

(10) Patent No.: US 7,072,358 B2
(45) Date of Patent: Jul. 4, 2006

(54) TRANSMISSION AND INTERCONNECTION METHOD

(75) Inventor: Jyri Suvanen, Helsinki (FI)

(73) Assignee: Nokia Corporation, Espoo (FI)

( * ) Notice: Subject to any disclaimer, the term of this patent is extended or adjusted under 35 U.S.C. 154(b) by 925 days.

(21) Appl. No.: 09/997,200

(22) Filed: Nov. 28, 2001

(65) Prior Publication Data
US 2002/0086667 A1    Jul. 4, 2002

Related U.S. Application Data

(63) Continuation of application No. PCT/EP99/03764, filed on May 31, 1999.

(51) Int. Cl.
*H04J 3/16* (2006.01)

(52) U.S. Cl. ........................ 370/465; 370/328
(58) Field of Classification Search ............ None
See application file for complete search history.

(56) References Cited

U.S. PATENT DOCUMENTS

| | | | |
|---|---|---|---|
| 6,301,250 B1 | 10/2001 | Schmitz | 370/395 |
| 6,308,063 B1 | 10/2001 | Koistinen et al. | 455/422 |
| 6,445,917 B1 * | 9/2002 | Bark et al. | 455/423 |
| 6,466,556 B1 * | 10/2002 | Boudreaux | 370/331 |
| 6,725,038 B1 * | 4/2004 | Subbiah | 455/436 |
| 6,807,421 B1 * | 10/2004 | Ahmavaara | 455/438 |

FOREIGN PATENT DOCUMENTS

| | | |
|---|---|---|
| WO | WO 99/21383 | 4/1999 |
| WO | 0051387 | 8/2000 |
| WO | 0054526 | 9/2000 |
| WO | 0074411 | 12/2000 |
| WO | 0137606 | 5/2001 |

OTHER PUBLICATIONS

ETS 300 979, GSM "Digital Cellular Telecommunications System; Inband Control of Remote Transcoders and Rate Adaptors for Half-Rate Traffic Channels" (BSM 08.61 v 5.0.1, May 1997.
ETS 300 737, GSM 08.60 v 5.1.1, "Digital Cellular Telecommuni-cations System (Phase 2+); Inband Control of Remote Transcoders and Rate Adaptors for Enhanced Full Rate (EFR) and Full Rate Traffic Channels", 2nd Ed., Feb. 1998.
ETSI TS 101 504 v 4 7.1.0 (Apr. 2000), "Digital Cellular Tele-communicatios System (Phase 2+); Inband Tandem Free Operation (TFO) of Speech Codecs; Service Description; Stage 3", GSM 06.8 v 7.1.0 Release 1998.

(Continued)

*Primary Examiner*—Duc Ho
*Assistant Examiner*—Thien D. Tran

(57) ABSTRACT

Data are transmitted between a core network (CN) and at least one access system (BSS) of a GSM based access system type via an Iu interface (Iu-I/F). Also, the present invention aims to provide accordingly adapted network elements. By virtue of the present invention, substantial savings concerning resources can be obtained by supporting data formats of GSM coded speech on the open, i.e., not network operator proprietary, Iu interface according to UMTS/$3^{rd}$ generation specifications. Thus, GSM transcoders and $3^{rd}$ generation transcoders as well as GSM base station controllers and $3^{rd}$ generation radio network controllers can be integrated, so that the same hardware resources can be used for both systems, i.e., for GSM as well as for $3^{rd}$ generation.

10 Claims, 6 Drawing Sheets

OTHER PUBLICATIONS

"Research Activities on UMTS Radio Interface, Network Architectures, and Planning", E. Berruto et al, *IEEE Communi-cations Magazine*, Feb. 1998, pp. 82-95.

"GRAN'—A New Concept for Wireless Access in UMTS", A. Schieder et al, *XVI World Telecom Congress Proceedings*, Pub. Sep. 29, 1997, pp. 339-345.

* cited by examiner 16 kbit/s TRAU FRAME

| OCTET | BIT 1 | BIT 2 | BIT 3 | BIT 4 | BIT 5 | BIT 6 | BIT 7 | BIT 8 |
|---|---|---|---|---|---|---|---|---|
| 0 | 0 | 0 | 0 | 0 | 0 | 0 | 0 | 0 |
| 1 | 0 | 0 | 0 | 0 | 0 | 0 | 0 | 0 |
| 2 | 1 | C1 | C2 | C3 | C4 | C5 | C6 | C7 |
| 3 | C8 | C9 | C10 | C11 | C12 | C13 | C14 | C15 |
| 4 | 1 | D1 | D2 | D3 | D4 | D5 | D6 | D7 |
| 5 | D8 | D9 | D10 | D11 | D12 | D13 | D14 | D15 |
| . | . | | | | | | | |
| . | . | | | | | | | |
| . | . | | | | | | | |
| 36 | 1 | D241 | D242 | D243 | D244 | D245 | D246 | D247 |
| 37 | D248 | D249 | D250 | D251 | D252 | D253 | D254 | D255 |
| 38 | 1 | D256 | D257 | D258 | D259 | D260 | C16 | C17 |
| 39 | C18 | C19 | C20 | C21 | T1 | T2 | T3 | T4 |

FIG. 5

| OCTET | BIT 1 | BIT 2 | BIT 3 | BIT 4 | BIT 5 | BIT 6 | BIT 7 | BIT 8 |
|---|---|---|---|---|---|---|---|---|
| 0 | D1 | D2 | D3 | D4 | D5 | D6 | D7 | D8 |
| 1 | D9 | D10 | D11 | D12 | D13 | D14 | D15 | D16 |
| . | . | | | | | | | |
| . | . | | | | | | | |
| . | . | | | | | | | |
| 31 | D249 | D250 | D251 | D252 | D253 | D254 | D255 | D256 |
| 32 | D257 | D258 | D259 | D260 | C1 | C2 | C3 | C4 |
| 33 | C5 | C6 | C7 | C8 | C9 | C10 | C11 | C12 |
| 34 | C13 | C14 | C15 | C17 | DS1 | S1 | S2 | S3 |

FIG. 6

8 kbit/s TRAU FRAME

| OCTET | BIT 1 | BIT 2 | BIT 3 | BIT 4 | BIT 5 | BIT 6 | BIT 7 | BIT 8 |
|---|---|---|---|---|---|---|---|---|
| 0 | 0 | 0 | 0 | 0 | 0 | 0 | 0 | 0 |
| 2 | 1 | C1h | C2h | C3h | C4h | C5h | XC1 | XC2 |
| 3 | 0 | 1 | XC3 | XC4 | XC5 | XC6 | D1h | D2h |
| 4 | 1 | D3h | D4h | D5h | D6h | D7h | D8h | D9h |
| 5 | 1 | D10h | D11h | D12h | D13h | D14h | D15h | D16h |
| . | . | | | | | | | |
| . | . | | | | | | | |
| . | . | | | | | | | |
| 9 | 1 | CRC2 | CRC1 | CRC0 | D45h | D46h | D47h | D48h |
| 11 | 1 | D49h | D50h | D51h | D52h | D53h | D54h | D55h |
| . | . | | | | | | | |
| . | . | | | | | | | |
| . | . | | | | | | | |
| 18 | 1 | D105h | D106h | D107h | D108h | D109h | D110h | D111h |
| 19 | 1 | D112h | C6h | C7h | C8h | C9h | T1 | T2 |

FIG. 7

| OCTET | BIT 1 | BIT 2 | BIT 3 | BIT 4 | BIT 5 | BIT 6 | BIT 7 | BIT 8 |
|---|---|---|---|---|---|---|---|---|
| 0 | D1h | D2h | D3h | D4h | D5h | D6h | D7h | D8h |
| 1 | D9h | D10h | D11h | D12h | D13h | D14h | D15h | D16h |
| . | . | | | | | | | |
| . | . | | | | | | | |
| . | . | | | | | | | |
| 13 | D102h | D103h | D104h | D105h | D106h | D107h | D108h | D109h |
| 14 | D110h | D111h | D112h | C1h | C2h | C3h | C4h | C5h |
| 15 | XC1 | XC2 | XC3 | XC4 | XC5 | XC6 | TAC | C6h |
| 16 | C7h | C8h | C9h | DS1 | S1 | S2 | S3 | S4 |

FIG. 8

TRANSMISSION AND INTERCONNECTION METHOD

CROSS-REFERENCE TO RELATED APPLICATION

This application is a continuation of International Application PCT/EP99/03764 having an international filing date of 31 May 1999 and from which priority is claimed under all applicable sections of Title 35 of the United States Code including, but not limited to, Sections 120, 363 and 365(c).

FIELD OF THE INVENTION

The present invention relates to a transmission and interconnection method for transmitting data in a telecommunication network and also to a corresponding telecommunication network. Still further, the present invention also concerns corresponding network elements to be used in and/or forming part of such a telecommunication network. Particularly, the present invention relates to mobile telecommunication networks based on radio telecommunication.

BACKGROUND OF THE INVENTION

In currently used mobile radio telecommunication systems such as the existing GSM system, radio resources are limited due to the limited radio spectrum available and/or reserved for such purposes. The saving of radio resources is achieved by the usage of codecs (encoding-decoding devices) which operate at low bit rates. Namely, with such low-bit-rate codecs, the transmission rate on a radio interface is reduced to/expanded from 13 kbps in current GSM systems.

Furthermore, existing mobile radio telecommunication networks like GSM networks have to co-operate with existing public switched telephone networks PSTN such as the currently spreading ISDN network (Integrated Services Digital Network).

However, ISDN-PSTN networks primarily use a representation for speech data of 64 kbps in pulse code modulation (PCM), while the mobile radio telecommunication network uses the above mentioned 13 kbps representation.

Hence, interoperability at an interface I/F between the two types of networks has to be provided for, which is achieved by an interworking function unit also referred to as IWF unit or gateway unit (GW).

In case a call is forwarded from the ISDN-PSTN network to a mobile station MS as a radio terminal device of the radio telecommunication network (and vice versa), a speech coding functionality is required on both sides, i.e., on the network side and on the terminal device side. Namely, speech data of a call forwarded from the ISDN-PSTN network have to be coded in the network side for transmission via the radio interface (air interface Um), and if speech data of "an answer" are transmitted from the terminal device side, the speech data have likewise to be coded for transmission via the air interface.

Such a transmission of coded speech using time divisional multiplexing (TDM) between the radio access part or access network of the telecommunication network (e.g., a base transceiver station) and a speech codec part (e.g., transcoder and/or Transcoding Rate and Adaptation Unit (TRAU)) associated to, for example, a Mobile Services Switching Center (MSC) as a part of a core network of the telecommunication network, according to GSM, is effected using so-called TRAU frames (for details, reference is made to GSM 08.60).

Now, if a call is established between two terminal devices MS_A and MS_B, speech data transmitted there between are normally transcoded twice. Namely, firstly speech is encoded in the terminal device MS_A and subsequently decoded in the network. Thus, the speech data are present in the 64 kbps PCM format. Thereafter, the speech is encoded again in the network for transmission to the terminal MS_B, where it is decoded upon being received.

Thus, the coding is performed twice, while such double coding adversely affects the quality of transmitted speech, which of course, is undesirable.

FIG. 1 shows known telecommunication system according to GSM specification. A mobile services switching center MSC is connected to a transcoder TC via the A interface A-I/F. The transcoder TC in turn is connected to the base station controller BSC as a transceiver control device via an Ater interface Ater-I/F. The base station controller in turn is connected to a transceiver device or base station BS via an Abis interface Abis-I/F. Such a base station (base transceiver station) BS communicates with a subscriber terminal such as a mobile station MS via an air interface or radio interface RADIO-I/F also referred to as Um interface Um-I/F.

In the above described network, at least the MSC forms part of a so-called core network, while at least the BSC and BS constitute an access network (radio access network). As regards the transcoder TC, which provides the TRAU functionality that includes speech coding and data rate adaptation, according to GSM, this transcoder is logically associated to the access network side, i.e. to the base station system BSS (formed by the BSC and BS) communicating with the core network, i.e. the MSC via the A interface A-I/F as an open interface.

It is to be noted that the present description distinguishes between an open interface on one hand and a proprietary interface on the other hand. The term "proprietary interface" is intended to designate an interface specific for an individual network and thus dependent on a network operator, while the term "open interface" is intended to designate an interface independent of individual networks and thus independent of network operators that can be accessed from different networks, presumably also run by different operators.

Thus, referring back to the transcoder TC, the above means that the base station system BSS is controlling the operation of the transcoder TC. However, data such as speech and/or other data is present in a 64 kbit/s PCM mode at the A interface A-I/F. Transmission at such an elevated or high data rate, however, is rather expensive, and therefore, the transcoder is physically located at the core network side, i.e., close to the MSC as a core network control device, thereby reducing the data rate already in the core network. Thus, speech and/or other data to be transmitted are transmitted via a physically actually long transmission path from the transcoder and the base station controller BSC in coded format, which transmission path is referred to as Ater interface Ater-I/F.

Recently, however, new telecommunication systems are currently being developed, which systems are referred to as third generation systems (in short 3G systems). Specific examples for such 3G systems are the UMTS (Universal Mobile Telecommunication System) and/or the IMTS-2000 (International Mobile Telecommunication System for the year 2000).

In those 3G telecommunication networks, the transcoder TC is also logically associated to (and mostly also physically located in) the core network side and communicates with the corresponding 3G access network via an open Iu interface Iu-I/F. That is, data/speech is transmitted in coded format over this interface based on ATM transmission principles (Asynchronous Transmission Mode).

FIG. 2 shows a specific implementation of a telecommunication network, which is adapted to establish communication with a GSM based terminal such as a mobile station MS as well as with a third generation based terminal denoted in FIG. 2 by 3G_MS. Those parts which are similar or identical to those illustrated in connection with FIG. 1 explained above are denoted with the same reference signs and their explanation is not repeated in connection with FIG. 2.

The specific configuration shown in FIG. 2 illustrates a case, in which the 3G core network is based on GSM technology, i.e. uses a GSM based core network control device MSC. In this case, the same MSC can handle/manage communication via GSM as well as via 3G (e.g. UMTS) radio networks via the open A interface A-I/F.

Therefore, as illustrated in FIG. 2, there has to be provided an interworking unit IWU for the 3G part of the system, adapted to perform an adaptation between the A interface A-I/F and the Iu interface Iu-I/F. Thus, the 3G transcoder TC must be located in association with the interworking unit IWU, as shown in FIG. 2. (In an alternative case, (not shown in the figure), the transcoder could be located in association with the 3G radio network controller RNC without Iu interface).

Anyway, in any such a case the transcoder TC for the GSM part has to be purchased from the same manufacturer as the rest of the base station system BSS (comprising BSC & BS's), since the Ater interface Ater-I/F is a proprietary interface uniquely adapted to each respective manufacturer and/or network operator. However, for the transcoder for the 3G network part IWU/TC this is not the case, and this transcoder does not underlay special requirements in terms of the manufacturer which has to supply the transcoder.

Thus, due to the imposed restrictions as set out above, such a telecommunication system suffers from a reduced flexibility and a degraded compatibility of network components. In addition, different transcoding hardware resources have to be provided for.

In a current implementation, data are transmitted via the Ater interface for GSM in a data format used for the Abis interface, i.e. in TRAU frames. However, these frames have been specified only for TDM (PCM transmission) and the respective implementations are also proprietary.

Thus, also these implementations suffer from the above described drawbacks.

SUMMARY OF THE INVENTION

Hence, it is an object of the present invention to provide a transmission method, a telecommunication network, and corresponding network elements which overcome the above problems, respectively.

According to the present invention, this object is achieved by a transmission method for transmission of data in a telecommunication network, said network comprising a core network and an access network, with said access network comprising at least one access system of a GSM based access system type; wherein data are transmitted between said core network and said at least one access system of a GSM based access system type of said access network via an Iu interface.

Also, according to the present invention this object is achieved by a telecommunication network, comprising a core network and an access network, with said access network comprising at least one access system of a GSM based access system type; wherein said core network is connected to said at least one access system of a GSM based access system type of said access network via an Iu interface.

Still further, the present invention concerns accordingly adapted network elements to be used in and/or forming part of said telecommunication network.

Favorable further refinements of the present invention are defined in the dependent claims.

Thus, with the present invention being implemented different radio systems such as GSM based and UMTS based radio systems or radio access networks can be connected to the same core network element.

Thereby, both access systems can share as much hardware and transmission capacity resources as possible.

Particularly, due to the GSM speech/circuit switched data format being supported by the 3G (open) Iu interface, this enables substantial savings as a GSM based transcoder and a third generation based transcoder can be integrated, thus being implemented in the same network node. Stated in other words, the same transcoder TC resources can be used for both access systems.

Also, a GSM based base station controller and a third generation radio network controller can be integrally provided as the same network element. This "merging" of previously separate network elements yields an advantage in that it is easier to connect GSM based transceiver devices and/or base stations and third generation based base stations to the telecommunication network at the same time.

According to a further embodiment, the transcoder can even be located at the gateway position/gateway node of the telecommunication network establishing a connection to other networks. This will enable further transmission optimization possibilities, particularly those possibilities as presented in applicants former patent application PCT/EP99/01615 can be applied to the then obtained network structure.

Still further, also GSM based transceiver devices (base stations) and third generation based transceiver devices (based on WCDMA (=Wideband Code Division Multiple Access) transmission principles could be integrated or merged, so that the Iu interface could even be extended from the transceiver devices up to the core network, so that an RNC/BSC based on ATM (as used in third generation) could forward coded speech/data directly via the Iu interface up the transceiver devices, i.e. base stations.

BRIEF DESCRIPTION OF THE DRAWINGS

The present invention will be more readily understood with reference to the accompanying drawings, in which FIG. 1 schematically shows a prior art telecommunication system according to GSM specification;

FIG. 5 illustrates a structure of a 16 kbit/s TRAU frame;

FIG. 6 illustrates a first frame type used on an ATM connection (Iu interface);

FIG. 7 illustrates a structure of a 8 kbit/s TRAU frame; and

FIG. 8 illustrates a second frame type used on an ATM connection (Iu interface).

DETAILED DESCRIPTION OF PREFERRED EMBODIMENTS

The present invention will now be described in detail with reference to the drawings.

According to the present invention, due to transmitting GSM coded speech and/or circuit switched data over the open Iu interface according to a third generation specification in addition to "normal" third generation data/speech formats, the Ater interface previously necessary for GSM based parts of telecommunication networks, can be dispensed with. The data/speech is transmitted via the Iu interface using specified transport frames supporting the transport of GSM speech/circuit switched data via the Iu interface.

Figure 1:
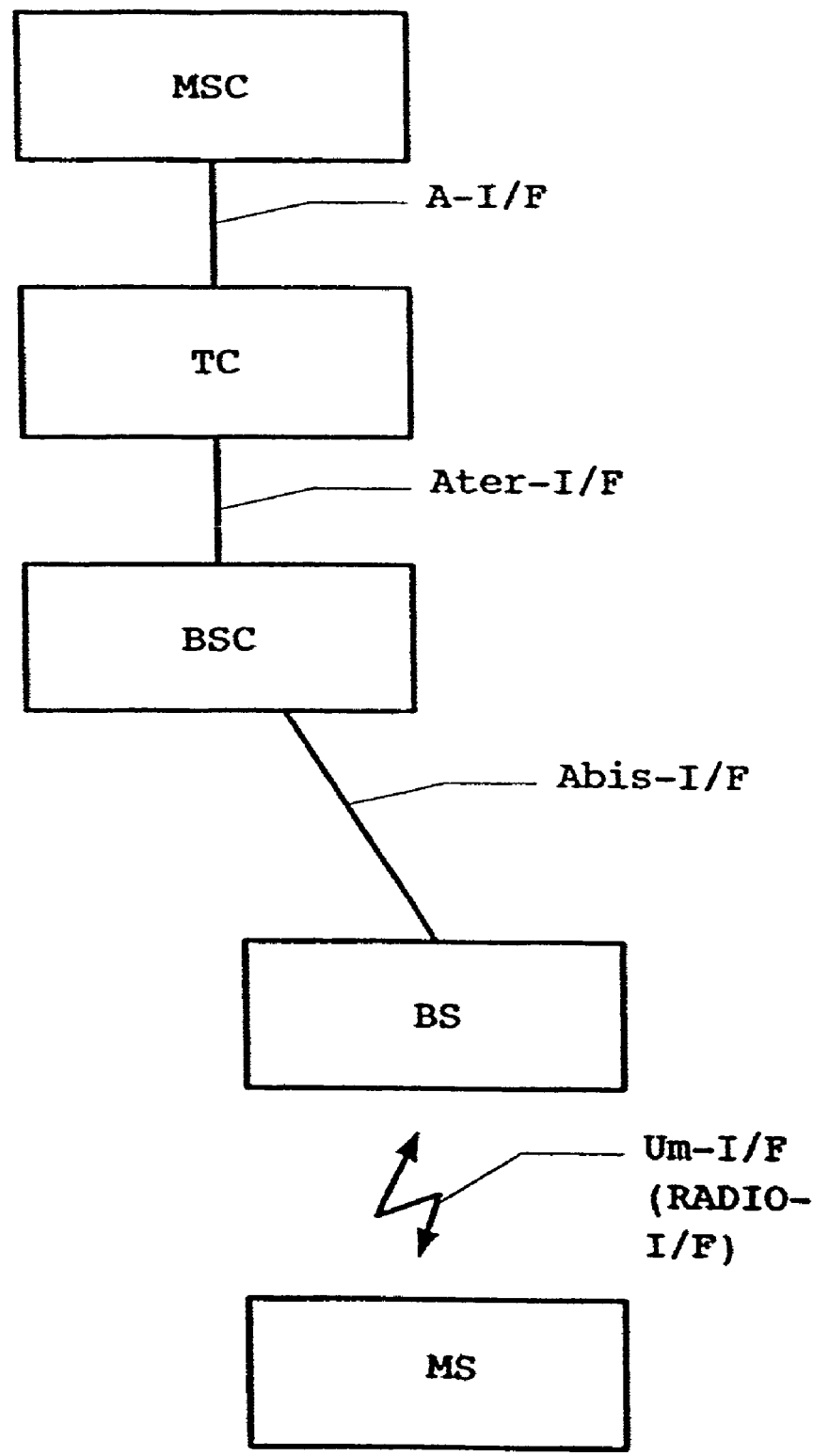
Figure 2:
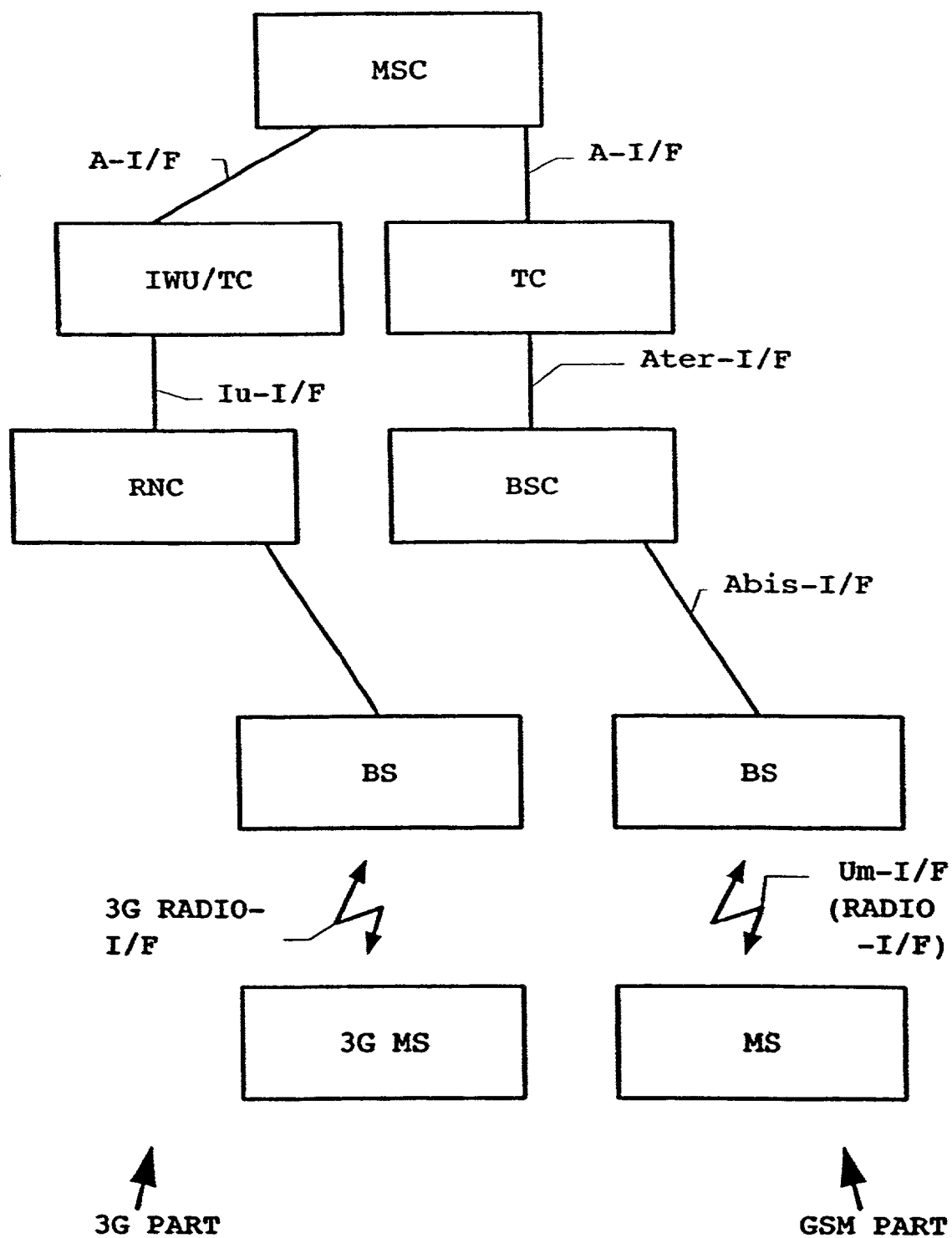
FIG. 2 shows a prior art telecommunication system comprising a telecommunication subsystem adapted to be operated according to GSM specification and a telecommunication subsystem adapted to be operated according to a third generation (3G) specification such as UMTS.
Figure 3:
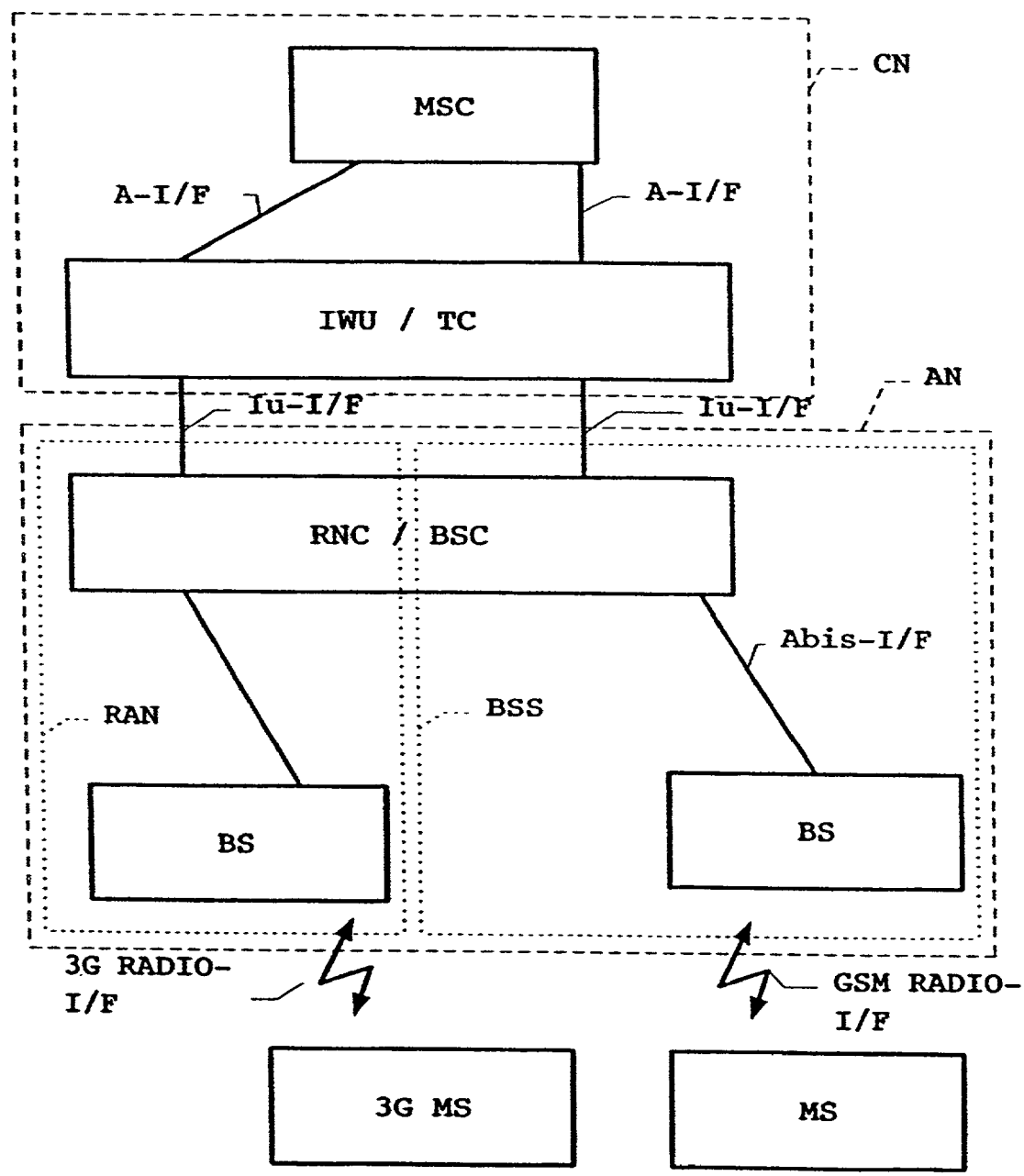
FIG. 3 shows a telecommunication network comprising access systems conforming to GSM and UMTS specification, respectively, according to a first embodiment of the present invention.

FIG. 3 shows a network architecture for a telecommunication network according to a first embodiment of the present invention. This particular example assumes that a core network control device, i.e., an MSC as a mobile services switching center, is GSM based.

The network comprises a core network CN and an access network AN. The core network may communicate via a gateway network element (not shown) with external communication networks (not shown) such as the PSTN/ISDN or an intelligent network (IN) such as the Internet.

The core network comprises, as shown in FIG. 3, a core network control device such as a mobile services switching center MSC. However, more than one MSC can be included in a core network, and also one of such MSCs is adapted to provide a gateway functionality, thus representing a gateway MSC (GMSC).

The MSC as shown in FIG. 3 communicates via the A interface A-I/F with a network element IWU/TC which combines the functionalities of an interworking unit IWU with those of a transcoder TC. The interworking unit IWU functionality is adapted to perform an adaptation of the A interface A-I/F to the Iu interface Iu-I/F, while the transcoding TC functionality is a combined transcoding functionality for the GSM based and 3G based network parts, which transcoding functionality resource is thus shared by both systems, GSM and 3G.

Thus, the core network communicates via the Iu interface Iu-I/F with the access network AN.

The access network AN comprises at least two access systems denoted with RAN, BSS, respectively, of different access system types. Namely, RAN specifies a radio access system conforming to third generation standards, while BSS specifies a base station system conforming to GSM standards.

In particular, the Iu interface Iu-I/F extends from the core network to an access network control device denoted by RNC/BSC in FIG. 3. This indicates that the control functionalities for both access system types are integrated in one and the same network element RNC/BSC. This network element RNC/BSC combines the functionalities of a third generation radio network controller RNC with those functionalities of a GSM based base station controller BSC. Thus, it is much easier to connect GSM based base stations BS and third generation based base stations BS (also sometimes referred to as "Node B") to the network at the same time, since they can share the same controller resources.

Nevertheless, the RNC/BSC network element can also be physically separated, though functionally and/or logically combined. In such a case, however, the BSC part thereof should be provided with an ATM based connection to the Iu interface Iu-I/F. In this instance, if the BSC is a stand alone entity and is provided with an ATM connection to the Iu interface, but not to the Abis interface (based on TDM transmission), the BSC is adapted to perform a conversion between TDM based data transmission formats (e.g. TRAU frames as specified in GSM recommendation 08.60) and ATM frame formats used in the Iu interface. This functionality is then preferably also located in the BSC.

Further, although the IWU/TC element and RNC/BSC element are both shown as integrated network elements in FIG. 3, only one of them could be provided as an integrated network element in a network.

In a modification (not shown) of the illustrated embodiment, it is also conceivable that a respective of said transceiver devices BS is connected to a said associated transceiver control device RNC/BSC via said interface of said same interface type Iu-I/F. Stated in other words, the transmission between BS and RNC/BSC should use the same medium/transmission principle such as ATM, so that the Iu interface is extended from the core network CN (and through the access network parts) up to the transceiver stations BS.

Figure 4:
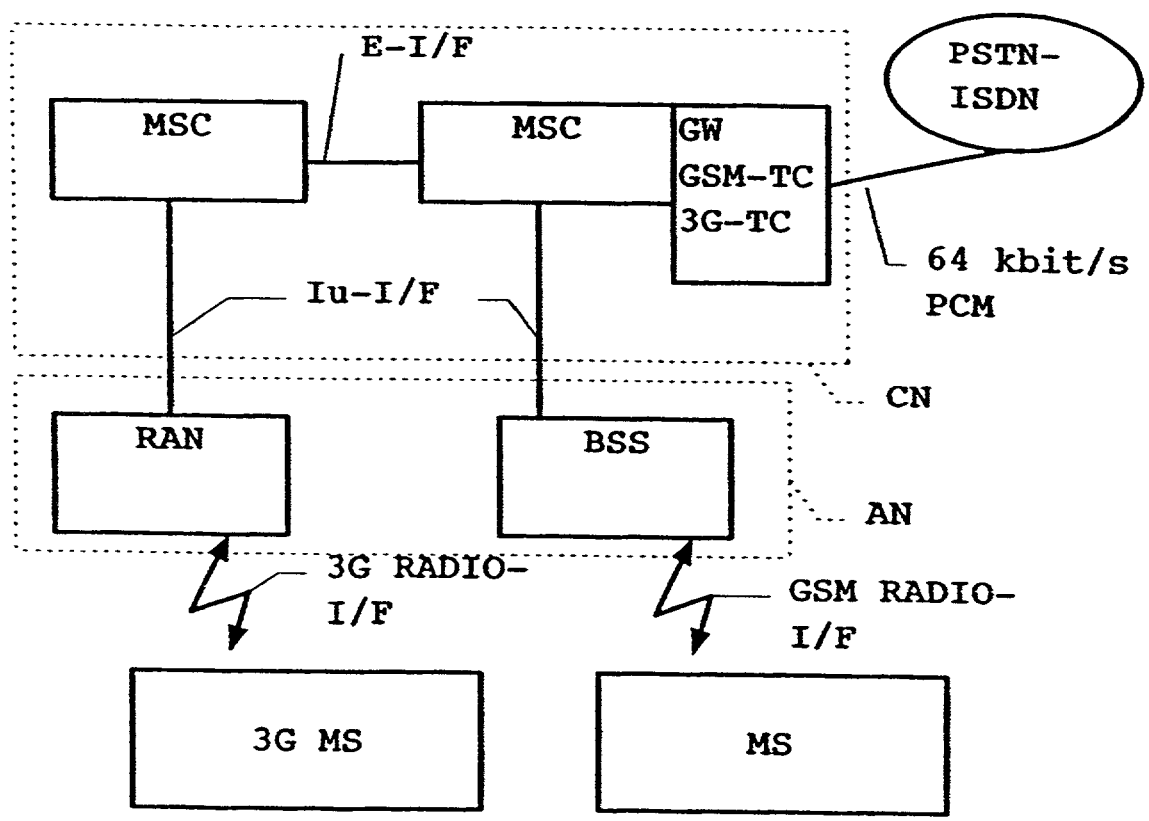
FIG. 4 shows a telecommunication network comprising access systems conforming to GSM and UMTS specification, respectively, according to a second embodiment of the present invention.

FIG. 4 shows a network architecture for a telecommunication network according to a second embodiment of the present invention. This particular example assumes that a core network control device, i.e., an MSC as a mobile services switching center, is based on a third generation specification.

As illustrated in FIG. 4, the core network CN consists of two MSCs in this specific example, with one of the MSCs being additionally provided with a gateway functionality GW for enabling a communication with an external communication network such as the PSTN/ISDN in the illustrated example. Due to the MSC's conforming to third generation specifications, there is no need for a separate IWU functionality. Therefore, the transcoder functionality TC can be located at the gateway functionality. The transcoder functionality TC comprises a GSM based transcoder functionality GSM-TC as well as third generation based transcoder functionality 3G-TC.

The core network CN is connected to the access network via the Iu interface only, as in the first embodiment. The access network is illustrated in a simplified manner as compared to the first embodiment in that only the third generation based access network part RAN and the GSM based access network part BSS as different access system types are depicted in the Figure. The remaining parts of the illustrated embodiment denoted with the same reference signs as in the first embodiment denote the like components and/or network elements and functionalities and a detailed repeated description thereof can be dispensed with. Note that in the core network CN in FIG. 4, an interface between different individual MSCs is constituted by a so-called E interface denoted with E-I/F.

Particularly, it should be noted that a RAN and a BSS access network system could be connected to each of the MSCs shown in FIG. 4, i.e., a single MSC can cope with the control of two different access network systems, similar to the case shown in FIG. 3.

In the case illustrated in FIG. 4, transmission savings can be obtained within the whole PLMN (Public Land Mobile Network) also if GSM access is used. Nevertheless, for an MS-MS call within such a network, the speech codecs used in the terminal devices, i.e. in the mobile stations MS, must be the same in both mobiles.

Also, in the second and first embodiments, the transport frame for speech data/circuit switched data transmission can be a speech frame, an O&M frame, a data frame, or an extended data frame based on the specification in GSM recommendation GSM 08.60, GSM 08.61 or GSM 08.62 (specifying Tandem Free Operation TFO). These recommendations include GSM coded speech format specifications, and particularly the latter one describes frame formats for an open A interface.

In particular, FIG. 5 illustrates the structure of a 16 kbit/s TRAU frame. The structure of the speech frame of FIG. 5 is specified in section 08.60 of the GSM specifications. Bits D1–D260 in octets 4–38 are used for transmitting the actual speech parameters. The bits in the first two octets are coded "0". The bits in question and the first bits (coded n1") in octets 2, 4, 6, . . . , 36 and 38 are synchronization bits. In accordance with the invention, the bits in question are not transmitted over the ATM connection, since they are not needed on that connection. The last four bits T1 to T4 (stop bits) and spare bits C18–C21 of the TRAU frame in question are not transmitted over the ATM connection either. Furthermore, a flag, i.e., a bit C16, used in the TRAU frame for indicating speech is not transmitted to the ATM connection, because its value can be detected at the receiving end on the basis of the value of a silence descriptor SID flag C13–C14. In FIG. 5, the bits that are transmitted over the ATM connection in accordance with the invention are shown in bold text, and the bits that are excluded are shown in normal text. (Note that ATM connection here stands for the transmission via the Iu interface.)

FIG. 6 illustrates a first frame type which is used on the ATM connection (Iu interface Iu-I/F) and, on that connection, substitutes in accordance with the invention the TRAU frame presented in FIG. 5. The frame of FIG. 6 can be used in the uplink (from base station system towards mobile services switching center) and in the downlink (from mobile services switching center towards base station system) directions.

In the frame of FIG. 6, bits D1–D260 are used for transmitting speech parameters. Bits C1–C5 indicate the frame type. Bits C6–C11 are timing bits. A bit C12 is used for bad frame indication BFI. Bits C13 and C14 form a SID flag. A bit C15 forms a TAF flag. A bit C17 is used in the uplink direction for controlling discontinuous transmission of the downlink direction. The bit in question is a spare bit in the downlink direction. A bit DS1 is used for indicating if the frame in question originates from the transcoder unit or from the base station system. Bits S1–S3 are spare bits.

FIG. 7 illustrates the structure of an 8 kbit/s TRAU frame. In the submultiplexed 8 kbit/s speech frame of FIG. 7, the bits that are transmitted in accordance with the invention over the ATM connection are shown in bold text. It can be detected from FIG. 7 that the bits to be excluded include synchronization bits, for example.

FIG. 8 illustrates a second frame type which is used on the ATM connection and, on that connection, substitutes in accordance with the invention the TRAU frame of FIG. 7. CRC bits CRC2-CRC0 are transmitted in their normal places between bits D44h and D45h.

Moreover, although the foregoing description has mainly focused on the transmission GSM coded speech/data over the (open) Iu interface, basically the same applies for transmission of GSM coded speech/data over the Iub and Iur interfaces (not shown). Iub denotes the interface between a third generation base station and the RNC. Iur denotes the interface between two RNC's. This means that within an access network AN the user-plane (frame) formats are then the same as those adopted for the Iu interface.

Accordingly, as has been described herein before, the present invention proposes a transmission method for transmission of data in a telecommunication network, said network comprising a core network CN and an access network AN, with said access network AN comprising at least one access system RAN; BSS of a GSM based access system type; wherein data are transmitted between said core network CN and said at least one access system BSS of a GSM based access system type of said access network AN via an Iu interface Iu-I/F. Also, the present invention aims to provide accordingly adapted network elements. By virtue of the present invention, substantial savings concerning resources can be obtained by supporting data formats of GSM coded speech on the open, i.e., not network operator proprietary, Iu interface according to UMTS/$3^{rd}$ generation specification. Thus, GSM transcoders and $3^{rd}$ generation transcoders as well as GSM base station controllers and $3^{rd}$ generation radio network controllers can be integrated, so that the same hardware resources can be used for both systems, i.e., for GSM as well as for $3^{rd}$ generation.

It should be understood that the above description and accompanying figures are merely intended to illustrate the present invention by way of example only. The preferred embodiments of the present invention may thus vary within the scope of the attached claims.

The invention claimed is:

1. A transmission method for transmission of data in a telecommunication network,
    said network comprising a core network (CN) and an access network (AN),
        with said access network (AN) comprising
            at least one access system (RAN, BSS) of a GSM based access system type;
    wherein data are transmitted between said core network (CN) and said at least one access system (BSS) of a GSM based access system type of said access network (AN) via an Iu interface (Iu-I/F) wherein each of said at least one access systems (RAN, BSS) comprises at least one transceiver device (BS) and an associated transceiver control device (RNC/BSC), and wherein data are transmitted within each of said access systems (RAN, BSS) via an Iub and/or an Iur interface in a frame format which is the same as the one adopted for said Iu interface (Iu-IF).

2. A method according to claim 1, wherein data are transmitted via said interface as coded data which are coded as specified by the UMTS (Universal Mobile Telecommunication System) specifications or as coded data which are coded according to GSM specifications.

3. A method according to claim 2, wherein said transmitted data coded according to GSM specifications are transmitted via said interface using a specified transport frame adapted to the transmission of GSM speech data and circuit switched data.

4. A method according to claim 3, wherein said transport frame is a speech frame, an O&M frame, a data frame, or an extended data frame based on the specification in GSM recommendation GSM 08.60, GSM 08.61, or GSM 08.62.

5. A telecommunication network, comprising
    a core network (CN) and an access network (AN),
        with said access network (AN) comprising
            at least one access system (RAN, BSS) of a GSM based access system type;

wherein said core network (CN) is connected to said at least one access system (RAN, BSS) of a GSM based access system type of said access network (AN) via an Iu interface (Iu-I/F) wherein each of said at least one access systems (RAN, BSS) comprises at least one transceiver device (BS) and an associated transceiver control device (RNC/BSC), and wherein data are transmitted within each of said access systems (RAN, BSS) via an mb and/or an Iur interface in a frame format which is the same as the one adopted for said Iu interface (Iu-IF).

6. A network according to claim 5, wherein said core network (CN) comprises a network element (IWU/TC) adapted to perform transcoding functionality (TC) according to GSM specification as well as a transcoding functionality (IWU) according to UMTS specification.

7. A network according to claim 6, wherein said network element (IWU/TC) is provided with said Iu interface (Iu-I/F) for connection to said access network (AN) and is provided with an A interface (A) for connection to a core network control device (MSC).

8. A network according to claim 6, wherein said network element (IWU/TC) is a gateway (GW) network element of said core network (CN) associated to a core network control device (MSC).

9. A network according to claim 5 wherein said transceiver control device (RNC/BSC) is adapted to perform a control functionality (BSC) according to GSM specification as well as a control functionality (RNC) according to UMTS specification.

10. A network according to claim 9, wherein said transceiver control device (RNC/BSC) is provided with said Iu interface (Iu-I/F) for connection to said core network (CN).

* * * * *

UNITED STATES PATENT AND TRADEMARK OFFICE
CERTIFICATE OF CORRECTION

| | | |
|---|---|---|
| PATENT NO. | : 7,072,358 B2 | Page 1 of 1 |
| APPLICATION NO. | : 09/997200 | |
| DATED | : July 4, 2006 | |
| INVENTOR(S) | : Jyri Suvanen | |

It is certified that error appears in the above-identified patent and that said Letters Patent is hereby corrected as shown below:

Column 9, line 8 (claim 5, line 13) "mb" should be --lub--.

Signed and Sealed this

Third Day of April, 2007

JON W. DUDAS
*Director of the United States Patent and Trademark Office*

UNITED STATES PATENT AND TRADEMARK OFFICE
CERTIFICATE OF CORRECTION

PATENT NO. : 7,072,358 B2
APPLICATION NO. : 09/997200
DATED : July 4, 2006
INVENTOR(S) : Jyri Suvanen Page 1 of 1

It is certified that error appears in the above-identified patent and that said Letters Patent is hereby corrected as shown below:

Column 9, line 8 (claim 5, line 13) "mb" should be --Iub--.

This certificate supersedes the Certificate of Correction issued April 3, 2007.

Signed and Sealed this

Third Day of November, 2009

David J. Kappos
*Director of the United States Patent and Trademark Office*